(12) United States Patent
Wakeford et al.

(10) Patent No.: US 10,026,404 B1
(45) Date of Patent: *Jul. 17, 2018

(54) DYNAMICALLY SELECTING SPEECH FUNCTIONALITY ON CLIENT DEVICES

(71) Applicant: Electronic Arts Inc., Redwood City, CA (US)

(72) Inventors: Kent Wakeford, Hillsborough, CA (US); Clifford J. Harrington, San Francisco, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,935

(22) Filed: Sep. 18, 2017

Related U.S. Application Data (63) Continuation of application No. 14/107,615, filed on Dec. 16, 2013, now Pat. No. 9,767,803.

(51) Int. Cl.
*G10L 15/28* (2013.01)

(52) U.S. Cl.
CPC .................................. *G10L 15/28* (2013.01)

(58) Field of Classification Search
CPC ...... G10L 15/005; G10L 15/28; G10L 15/285; G10L 15/30; G10L 15/32; G10L 15/34; G10L 15/20; G10L 15/22; G10L 15/06; G10L 15/07; G10L 19/00; G10L 15/065; G10L 15/18; G10L 21/0208

See application file for complete search history.

(56) References Cited

U.S. PATENT DOCUMENTS

| | | | | |
|---|---|---|---|---|
| 6,427,006 | B1 * | 7/2002 | Reding | H04M 3/51 |
| | | | | 379/201.01 |
| 6,487,534 | B1 * | 11/2002 | Thelen | G10L 15/30 |
| | | | | 704/270 |
| 6,505,161 | B1 | 1/2003 | Brems | |
| 8,635,243 | B2 | 1/2014 | Phillips | |
| 8,886,540 | B2 | 11/2014 | Cerra | |
| 9,275,635 | B1 | 3/2016 | Beaufays | |
| 9,565,304 | B2 * | 2/2017 | Jeong | H04M 3/4878 |

(Continued)

OTHER PUBLICATIONS

Jeevan, R., "Building on IPhone", CMUSphinx Wiki, http://cmusphinx.sourceforge.net/wiki/building, May 26, 2011, 2 pages.

*Primary Examiner* — Abdelali Serrou
(74) *Attorney, Agent, or Firm* — Knobbe, Martens, Olson & Bear, LLP (57) ABSTRACT

A system and method for dynamically selecting speech recognition functionality on a client device for recognizing user speech inputs are disclosed. Such selection may be made based on speech recognition functionalities actually available on the client devices. The speech functionalities that may be dynamically selected may include, without limitation, speech recognition software and/or services, speech libraries, kernel drivers, speech recognition hardware, audio hardware, and/or any other speech functionality available on a client device. User speech inputs may be processed via the selected speech functionality for generating control commands in a virtual space. In some implementations, remote speech recognition support may be evoked when a client device does not have any speech recognition functionality on the client device.

18 Claims, 4 Drawing Sheets

(56) References Cited

U.S. PATENT DOCUMENTS

| | | | |
|---|---|---|---|
| 9,570,076 B2 | 2/2017 | Sierawski | |
| 9,582,245 B2 | 2/2017 | Kim | |
| 9,589,564 B2 | 3/2017 | Sharifi | |
| 2002/0077814 A1 | 6/2002 | Garudadri | |
| 2007/0156407 A1 | 7/2007 | Schedl | |
| 2008/0235021 A1* | 9/2008 | Cross | G10L 21/06 704/257 |
| 2009/0094033 A1* | 4/2009 | Mozer | G10L 15/22 704/251 |
| 2010/0088100 A1* | 4/2010 | Lindahl | G10L 15/30 704/270.1 |
| 2011/0055256 A1* | 3/2011 | Phillips | G10L 15/30 707/769 |
| 2011/0066634 A1* | 3/2011 | Phillips | G10L 15/22 707/769 |
| 2012/0022853 A1 | 1/2012 | Ballinger | |
| 2012/0075338 A1* | 3/2012 | Curtis | G06Q 30/02 345/629 |
| 2013/0185070 A1* | 7/2013 | Huo | G10L 15/063 704/243 |
| 2014/0026075 A1* | 1/2014 | Goller | G10L 15/28 715/753 |
| 2015/0019221 A1* | 1/2015 | Lee | G10L 15/08 704/246 |
| 2015/0120287 A1 | 4/2015 | Stern | |

\* cited by examiner

| S.R. Functionality ID | Interface Control | Result Buffer | |
|---|---|---|---|
| S.W./Service #1 | CMD#1 Param #1 #2 ... | Result File #1 | |
| 604 | 604 | 604 | |
| S.W./Service #X | CMD#X Param #1 #2 ... | Result File #X | |
| OS#1 S.R. Lib #1 | Runtime Ptr Addr #1 | Buffer Addr #1 | |
| 606 | 606 | 606 | |
| OS#X S.R. Lib #X | Runtime Ptr Addr #X | Buffer Addr #X | |
| Device #1 S.R. HW#1 | Driver #1 Param#1 ... | Result Buffer #1 | |
| 608 | 608 | 608 | |
| Device #X S.R. HW#X | Driver #X Param#X ... | Result Buffer #X | |

DYNAMICALLY SELECTING SPEECH FUNCTIONALITY ON CLIENT DEVICES

FIELD OF THE DISCLOSURE

This disclosure relates to dynamically selecting speech recognition functionalities for recognizing speech input through client devices, the dynamic selection of the speech recognition functionalities being based on client device information obtained at a runtime.

BACKGROUND

Facilitating speech recognition through computing devices is generally known. For example, Android™ operating system provides application programing interface (API)—android.speech for android apps to receive transcripts translated from speech inputs by users. iOs on the other hand uses remote speech recognition service—Siri for recognizing speech inputs from users. Various other operating systems like Microsoft Windows™ provide speech recognition development tool kits for application developers to include program codes that perform speech recognition during runtime of an application running on those operating systems.

Conventional development of a speech recognition feature in a cross-platform application typically involves separate coding to employ platform specific speech recognition APIs for evoking speech recognition functionalities provided by different operating systems. For example, for developing an application running on Android, iOS and other operating systems, the developer(s) of the application is required to have knowledge of speech recognition APIs provided by those operating systems for evoking speech recognition functionalities provided by the client devices installed with those operating systems. The code base of such an application thereby may comprise platform specific code sections corresponding to those APIs; or in some other cases, multiple versions of the application corresponding to different operating systems may be deployed.

Some speech recognition packages were developed to encapsulate platform specific speech recognition APIs. Those packages typically provide their own APIs with generic functional controls of speech recognition functionalities independent from underlying operating systems. While this approach somewhat reduces maintenance and programming effort for developing and deploying cross-platform applications with speech recognition features, the selection of speech recognition functionalities for different operating systems in an application employing such an package is typically done statically at a configuration stage, e.g., during the development stage of the application. Under this approach, the decision of evoking specific speech recognition functionality for a type of operating system is typically predetermined by the provider of the package (e.g., hardcoded in the package) regardless speech recognition functionalities actually available on client devices at runtime. For example, an application employing such a package is typically linked with android.speech for deployment on Android devices as hardcoded by the package regardless whether the Android devices will actually have android-.speech or some other speech functionality available on device.

SUMMARY

One aspect of the disclosure relates to dynamically selecting a speech recognition functionality provided by a client device for generating control commands in a virtual space. Unlike the traditional approaches, the disclosed selection of speech recognition functionality for recognizing user speech inputs may be made based on speech functionality actually available on the client device. For facilitating such dynamic selection of speech recognition functionality on the client device, client device information may be obtained. The obtained client device information may indicate specific speech recognition functionality available on the client device, such as, without limitation, one or more speech recognition software and/or services, speech recognition libraries, speech recognition hardware, and other speech recognition functionality. In some examples, the dynamic selection of speech recognition functionality may involve a selection of optimal speech recognition functionality for recognizing user speech inputs through the client device. In some examples, a test may be performed to test different speech recognition functionality provided by the client device for such selection. In some implementations, remote speech service may be evoked for client devices that do not provide any speech recognition functionality. In contrast to the traditional approaches, this approach may enhance performance of speech recognition on a client device as speech recognition functionality actually available on the client may be dynamically selected for recognizing user speech inputs.

A system configured for dynamically selecting speech functionality on a client device may include a server. The server may operate in a client/server architecture with one or more client computing platforms. The client computing platforms may be associated with the users of the virtual space. The server may be configured to execute one or more of a client device component, speech recognition functionality component, a speech input processing component and/or other components.

The client device component may be configured to obtain device information regarding client devices associated with users. The information obtained by the client device component may include information indicating speech recognition functionality available on the given client device. The given client device may provide speech recognition functionality for recognizing speech inputs by users through, for example, without limitation, speech recognition software, service, libraries (including runtime libraries), drivers, audio hardware, speech hardware and/or any other speech recognition functionality. The speech recognition software available on a given client device may include software programs provided by a third party speech software provider, speech software add-on provided by the provider of the operating system installed on the given client device, and any other types of speech recognition software programs. The speech recognition service available on a given client device may include $3^{rd}$ party speech recognition support for the given client device. The speech libraries available on the given client device may include native speech libraries provided by the operating systems, speech libraries provided by $3^{rd}$ party providers, and/or any other types of speech libraries available on the given client device. The speech recognition hardware may include language processors, speech synthesizers, speakers, headsets with speakers, Bluetooth headsets, hands-free car kits, and any other hardware installed on the given client device for recognizing user speech inputs.

In some implementations, the client device component may determine speech recognition functionality available for recognizing user speech inputs based on the client device information obtained. For example, the client device component may determine specific speech recognition functionality available on the given client device based on the type of device, the operating system installed on client device, the serial number of the client device, and/or any other identification associated with the given client device. In some examples, such a determination by the client device component may be based on specifications specifying associations between specific speech recognition functionality and corresponding client devices that provide respective speech recognition functionality.

The speech recognition functionality component may be configured to dynamically select speech recognition functionalities provided by individual client devices for recognizing speech inputs provided by user. The selection of the speech recognition functionalities by the client device component may be based on the client device information obtained by the client device component. In some implementations, such selection of speech functionality on the client device by the speech recognition functionality component may be based on one or more selection criteria. The selection criteria may include, for example, a specified priority list of specific speech recognition functionality that should be selected by the client device component.

In some implementations, the speech recognition functionality component may dynamically select speech recognition functionality on a client device by performing one or more tests on the speech recognition functionality available on a client device. The tests may include a test testing whether the individual ones of the speech recognition functionality available on the given client device are capable of recognizing speech input patterns of interest, a test testing how sensitive to background noise the individual ones of the speech recognition functionality are, a test testing how accurate the individual ones of the speech recognition functionality are for recognizing certain speech pattern or points, a test testing how adaptive the individual ones of the speech recognition functionality are, a test testing how responsive the individual ones of the speech recognition functionality are, and/or any other tests. Such tests may be performed on the given client device by evoking such individual ones of speech recognition functionality. One or more results may be obtained at conclusion of the tests. Based on the results, the speech recognition functionality component in those implementations may assign score, rank, rating, and/or any other judgment to the individual ones of speech recognition functionality available on the given client device. Base on such judgment, the speech recognition functionality component may select speech functionality on the given client device for recognizing user speech inputs, for example the one with highest test score.

The speech input processing component may be configured to process speech inputs for generating control commands in a virtual space. The control commands may include commands for instructing one or more activities to be performed in the virtual space on behalf of user, for interacting with other users in the virtual space, for causing one or more prescribed functions to be executed, and/or any other types of commands. For generating such control commands, the speech input processing component may be configured to initiate user speech input reception via client devices using speech functionalities selected by the speech recognition functionality component.

In some implementations, for receiving user speech inputs via the selected speech functionality on the given client device, the speech input processing component may be configured with or have access to information specifying control details for evoking various speech recognition functionalities on client devices. Such control information may provide instructions to the speech input processing component for evoking specific speech functionalities provided by client devices. In some implementations, the speech input processing component may be configured to initiate speech recognition through a remote speech recognition service over the Internet when a client device does not have speech recognition functionality available.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
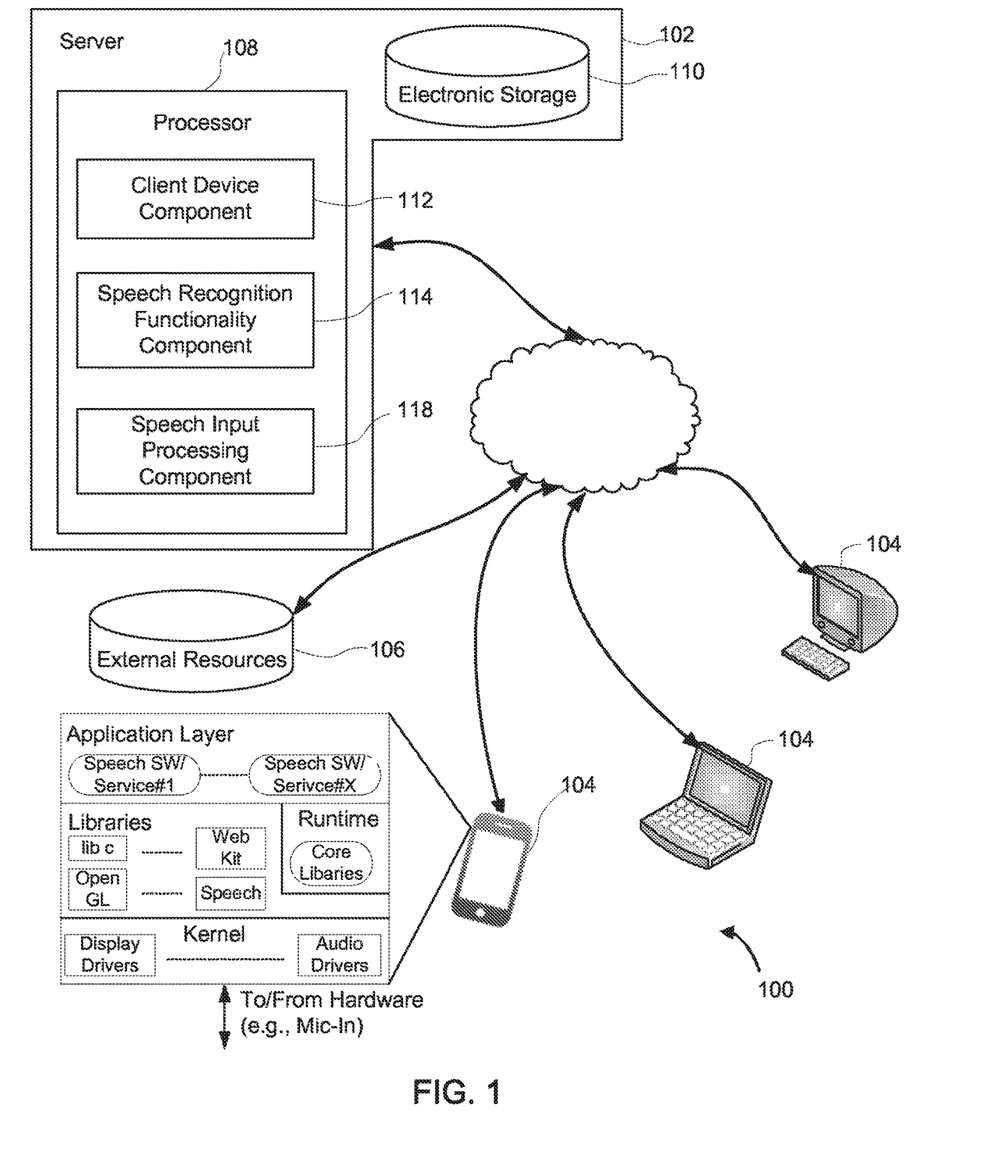
FIG. 1 illustrates a system for dynamically selecting speech recognition functionality on a client device for generating control commands in a virtual space in accordance with the disclosure.

FIG. 1 illustrates a system 100 for dynamically selecting speech recognition functionality on a client device for generating control commands in a virtual space in accordance with the disclosure. Providing the virtual space may include hosting the virtual space over a network. In some implementations, system 100 may include a server 102. The server 102 may be configured to communicate with one or more client computing platforms 104 according to a client/server architecture. The users may access system 100 and/or the virtual space via client computing platforms 104. The server 102 may comprise a processor 108 configured to execute computer readable instructions to implement system components. The computer program components may include one or more of client device component 112, speech recognition functionality component 114, speech input processing component 116 and/or other components.

The client device component 112 may be configured to obtain device information regarding client devices associated with users. The client device information obtained by client device component 112 for a given client device, such as a client device 104 shown in FIG. 1 may indicate, for example, but not limited to, the given client device's name, a mode associated with the given client device, serial number, operating system installed on the client device and/or version installed on the given client device (e.g., iOS 5, 6, 7, Android Honeycomb, Ice-cream, KitKat, Symbian OS, and/or any other operating systems that may be installed on the client device), one or more processors employed by the given client device (e.g., name, model type, version, so on), manufacturer of the given client device, manufacture date, purchase date, brand name of the given client device, speech recognition functionality available on the given client device, communication service provider of the given client device (e.g., internet service, wireless service, data service, and so on), and/or any other client device information associated with the given client device.

The information obtained by the client device component 112 may include information indicating speech recognition functionality available on the given client device. The given client device may provide speech recognition functionality for recognizing speech inputs by users through, for example, without limitation, speech recognition software, service, libraries (including runtime libraries), drivers, audio hardware, speech hardware and/or any other speech recognition functionality. The speech recognition software available on a given client device may include software programs provided by a third party speech software provider (e.g., Nuance™ Dragon speak software), speech software add-on provided by the provider of the operating system configured with the given client device (e.g., Kinect Voice Software, VoiceAttack, VacVoice, and other speech software add-ons provided by Microsoft for the Windows operating system), and any other types of speech recognition software programs. The speech recognition service available on a given client device may include $3^{rd}$ party speech recognition support for the given client device (e.g., Siri personal assistant, Google voice, Vlingo, Speaktoit, or any other $3^{rd}$ party speech recognition support), interactive voice response system employed by the given client device (e.g., AT&T Watson, iSpeech, Simmortel Voice, Tellme Networks, and any other interactive voice response systems). The speech libraries available on the given client device may include native speech libraries provided by the operating systems (e.g., android.speech, Kinect speech libraries, Windows system speech libraries, MacOS speech libraries, and any other native speech libraries provided by the operating systems), speech libraries provided by $3^{rd}$ party providers (e.g., Dragon Speak SDK, Creaceed SDK for iOS, iSpeech SDK, SpeechFX Voicein SDK, and any other $3^{rd}$ party speech libraries), and/or any other types of speech libraries available on the given client device. The speech recognition hardware may include language processors, speech synthesizers, speakers, headsets with speakers, Bluetooth headsets, hands-free car kits, and any other hardware installed on the given client device for recognizing user speech inputs.

The client device component 112 may obtain such client device information from the client device 104, e.g., via an interface on the client device 104 that provides such client device information. In those examples, the client device component 112 may be configured to detect whether a user is engaging in a voice control interaction with a virtual space through the client device 104. For instance, the client device component 112 may detect a given user has initiated voice interaction with a virtual space in a mobile app through a smartphone associated with the user. In that instance, in response to such detection, the client device component 112 may obtain the client device information indicating speech recognition functionality provided by the smartphone through which speech inputs provided by the given user may be received and recognized (e.g., translated to text). However, this is not necessarily the only case—in some other examples, the client device component 112 may simply poll the client device 104 or an information server (e.g., a client device information server, not illustrated in this example for illustration clarity) to obtain such client device information periodically.

In some implementations, for obtaining the client device information, the client device component 112 may send queries to client devices 104 or the information server, via an interface provided by the client devices 104 or the information server. Such an interface may include, but not limited to, application programming interface for obtaining client device information, common gateway interface, java EE, remote procedure call, and/or any other interfaces for obtaining client device information. In some examples, the client device information may be manifested by users through specifications, e.g. during a registration stage or prompted by prompts generated by the client device 104, and recorded in a database, file, and/or any other medium associated with or coupled to the server 102, e.g., on the electronic storage 110 and/or external resource 106.

Figure 2:
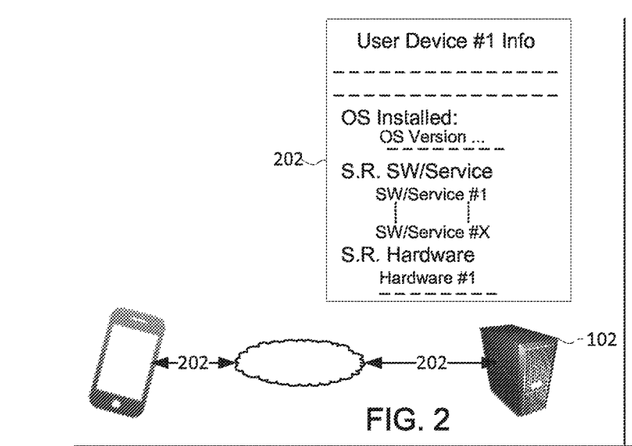
FIG. 2 illustrates one example of client device information obtained by the system shown in FIG. 1.

FIG. 2 illustrates one example of client device information obtained by the system shown in FIG. 1. It will be described with references to FIG. 1. As shown in this example, the client device information 202 may be obtained by the server 102 from a client device 104. As can be seen in this example, the client device information 202 or a portion thereof may include information indicating a version of operating system installed on the client device 104, speech recognition software and/or services available on the client device 104 for recognizing speech inputs from the users, speech recognition hardware available on the client device 104 and other information regarding the client device 104. It should be understood the client device information 202 described in this example is merely illustrative. In some other examples, the client device information obtained by the server 102, e.g., via the client device component 112 may include more or less client device information than that shown in this example. For example, the client device information 202 obtained by the server 102 may include information indicating one or more $3^{rd}$ party speech recognition software development kits installed on the client device 104.

Returning to FIG. 1, in some implementations, the client device component 112 may determine speech recognition functionality available on a client device for recognizing user speech inputs based on the client device information obtained. For example, the client device component 112 may determine specific speech recognition functionality available on the given client device 104 based on the type of device, the operating system installed on client device, the serial number of the client device, and/or any other identification associated with the client device. In some examples, such a determination by the client device component 112 may be based on specifications specifying associations between specific speech recognition functionality and corresponding client devices that provide such speech recognition functionality.

Figure 3:
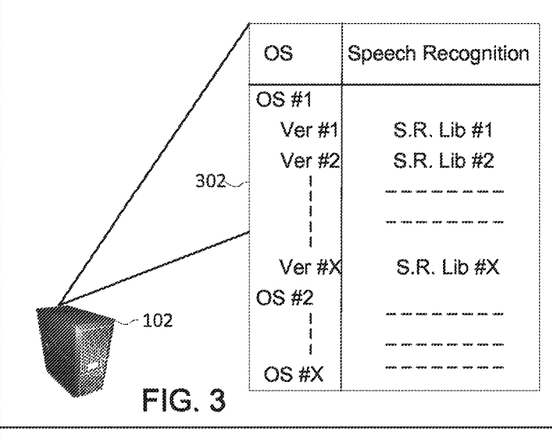
FIG. 3 illustrates one example of specification specifying associations between operating systems and specific speech recognition functionalities provided by the operating systems.

FIG. 3 illustrates one example of specification specifying associations between operating systems and specific speech recognition functionalities provided by the operating systems. As illustrated in FIG. 3, a table 302 may be employed by server 102, for example via the client device component 112 to determine which specific speech recognition software functionality is provided by an operating system installed on a given client device. As can be seen in FIG. 3, the table 302 may specify associations between specific operating systems (as identified by type and version—e.g., iOS 7) and corresponding speech recognition software functionality provided by the individual operating systems. As described above, such speech recognition functionalities may include speech libraries provided by the operating systems natively, $3^{rd}$ party speech libraries provided through the operating systems, and/or any other types of speech recognition functionalities that may be associated with operating systems or $3^{rd}$ party speech software/service.

Returning to FIG. 1, the speech recognition functionality component 114 may be configured to dynamically select speech recognition functionalities provided by individual client devices for recognizing speech inputs provided by user. The selection of the speech recognition functionalities by the client device component 112 may be based on the client device information obtained by the client device component 112. This may involve selecting speech recognition functionality from a group of speech recognition functionalities available on a given client device. By way of non-limiting example, in one illustrative scenario, the client device information obtained by the client device component 112 for a given client device 104 may indicate that the following speech recognition functionalities available on the given client device 104: speech recognition software provided by a third party provider, a native speech recognition library provided by the operating system installed on the given client device, a speech recognition SDK provided by the third party provider, and a language processor (hardware). In that example, based on such client device information, the client device component 112 may select one speech functionality, e.g., the $3^{rd}$ party speech recognition software from all of the speech recognition functionality available on the given client device 104 for recognizing speech inputs provide by users via the given client device 104.

In some implementations, such selection of speech functionality on the client device 104 by the speech recognition functionality component 114 may be based on one or more selection criteria configured with the speech recognition functionality component 114. In some examples, the selection criteria may be predetermined by the provider of the system 100 and specified in a file, database, disk, or any other types of medium accessible to the system 100. In some other examples, the selection criteria may be dynamically configured by a user, an administrator, or any other entity of the system 100 during a runtime of the system 100 via a graphical user interface. In still other examples, the selection criteria may be received from a server associated with the provider of the system 100 (e.g., a third party communication service provide).

In any case, the selection criteria may include, for example, a specified priority list of specific speech recognition functionality that should be selected by the client device component 112. Such a priority list may correspond to an individual type of client device. For example, the selection criteria may specify, for a client device having a given type (e.g., Android device), that native speech library provided by that type of client device should be selected for recognizing user speech inputs in cases wherein indicates the native speech library is installed on the client device; that in cases wherein the native speech recognition library is not installed but a specific third party speech SDK is installed on the client device, the $3^{rd}$ party speech recognition SDK for recognizing user speech inputs should be selected; in cases wherein none of the native speech recognition library or the $3^{rd}$ party recognition SDK is installed but a specific language processor is installed on the client device, the language processor should be selected; and so on. In some implementations, such a priority list may be configured with the speech recognition functionality component 114 in the form of case-switch statement. It should be understood that the number of listed speech recognition functionality in such a priority list may vary in different examples. In some examples, the priority list may contain only one speech recognition for selection for a given type of client device. Other examples of selection criteria for selecting speech recognition functionality on the client device are contemplated.

In some implementations, the speech recognition functionality component 114 may dynamically select speech recognition functionality on a client device by performing one or more tests on all or a portion of the speech functionalities available on the client devices. In those implementations, the dynamic selection of the speech recognition functionality by the speech recognition functionality component 114 may be based on a result of such tests. By way of non-limiting example, without limitation, the client device information obtained by the client device component 112 may indicate the following speech functionalities are available on a given client device 104: a first speech recognition software provided by a first $3^{rd}$ party provider, a second speech recognition software provided by a second $3^{rd}$ party provider, a remote speech service that may be employed via the given client device 104, a native speech library provided by the operating system installed on the given client device 104, a speech recognition software SDK provided by the first $3^{rd}$ party provider, and a language processor installed on the given client device 104. Base on such information, the speech recognition functionality component 114 in that example may perform one or more tests to test and rank speech recognition capabilities provided by these speech recognition functionality available on the given device 104. The tests may be predetermined and configured with the speech recognition functionality component 114 by the provider of system 100 or may be dynamically selected by an administrator of the system 100 during runtime via a graphical user interface.

The tests may include a test testing whether the individual ones of the speech recognition functionality available on the given client device 104 are capable of recognizing speech input patterns of interest, a test testing how sensitive to background noise the individual ones of the speech recognition functionality are, a test testing how accurate the individual ones of the speech recognition functionality are for recognizing certain speech pattern, a test testing how adaptive the individual ones of the speech recognition functionality are (e.g., is there learning capability, is it adaptive to accent), a test testing how responsive the individual ones of the speech recognition functionality are, and/or any other tests. Such tests may be performed on the given client device 104 by evoking these speech recognition functionalities, and one or more results may be obtained and compared. Based on the results, the speech recognition functionality component 114 in those implementations may assign score, rank, rating, and/or any other judgment to the speech recognition functionalities available on the given client device. Base on such judgment, the speech recognition functionality component 114 may select speech functionality on the given client device 104 for recognizing user speech inputs, for example the one with highest test score.

Figure 4:
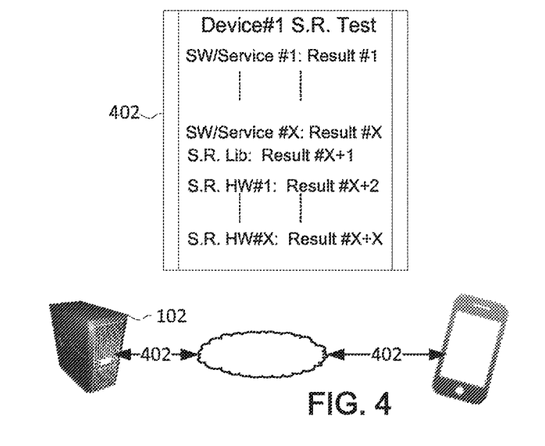
FIG. 4 illustrates one example of testing speech recognition functionality available on a client device for selection

FIG. 4 illustrates one example of testing speech recognition functionality available on a client device for selection. As can be seen in this example, the server 102 may perform one or more tests testing the speech functionality available on the client device 104. As illustrated, the server 102 may obtain test result information 402 indicating results of such tests, for example via the speech recognition functionality component 114. Base on the obtained test result information 402, the server 102 may select speech recognition functionality available on the client device 104 for recognizing speech inputs by the user.

Figure 5:
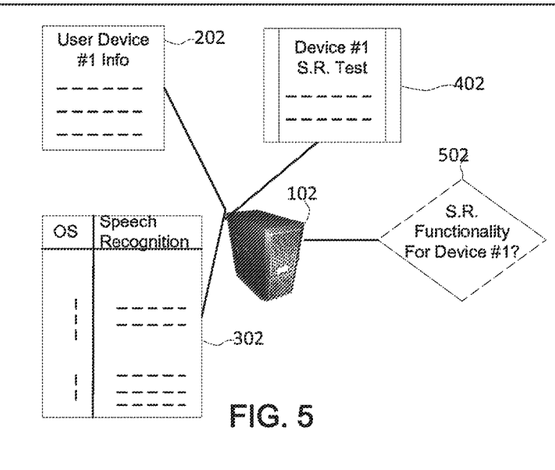
FIG. 5 illustrates one example of selecting speech recognition functionality available on a client device using the system shown in FIG. 1 in accordance with one embodiment of the disclosure

FIG. 5 illustrates one example of selecting speech recognition functionality available on a client device using the system shown in FIG. 1 in accordance with one embodiment of the disclosure. As shown, the server 102 may make a selection 502 selecting speech functionality available on a given client device 104 based on the client device information 202 illustrated in FIG. 2, the operating system speech recognition functionality table 302 illustrated in FIG. 3, the test result information 402, and/or any other information. As described above, in some implementations, the selection 502 may be made by the server 102 based on one or more selection criteria in view of these information.

The speech input processing component 116 may be configured to process speech inputs for generating control commands in a virtual space. The virtual space may include a game space wherein an online game takes place, an online space wherein social interactions among users take place, an application space wherein users may cause one or more execution of prescribed functions within the application space, and any other types of virtual space. The control command may include commands for instructing one or more activities to be performed in the virtual space on behalf of the user, for interacting with other users in the virtual space, for causing the one or more prescribed functions to be executed, and/or any other types of commands. Examples of control commands that may be generated through speech input processing by the speech input processing component 116 may include, but not limited to, directional commands for maneuvering a user character associated with a user in the virtual space (e.g., move the user character left or right), action commands that cause the user character to perform one or more actions (e.g., to jump, to duck, to perform a combination of movement sequences, just to name a few), commands for controlling various settings (e.g., increase volume, change avatar name, change a language preference, change a time zone, just to name a few), commands for communicating with other users in the virtual space, commands that evoke specific functions provided applications associated with the virtual space, and/or any other control commands.

For generating such control commands, the speech input processing component 116 may be configured to initiate user speech input reception via client devices 104. The speech input processing component 116 may initiate the client devices 104 to receive user speech inputs through the speech functionality selected by the speech recognition functionality component 114. The speech input processing component 116 may initiate a given client device 104 to start receiving speech inputs from users in a voice control mode using the speech functionality selected for the given client device by speech recognition functionality component 114.

Figure 6:
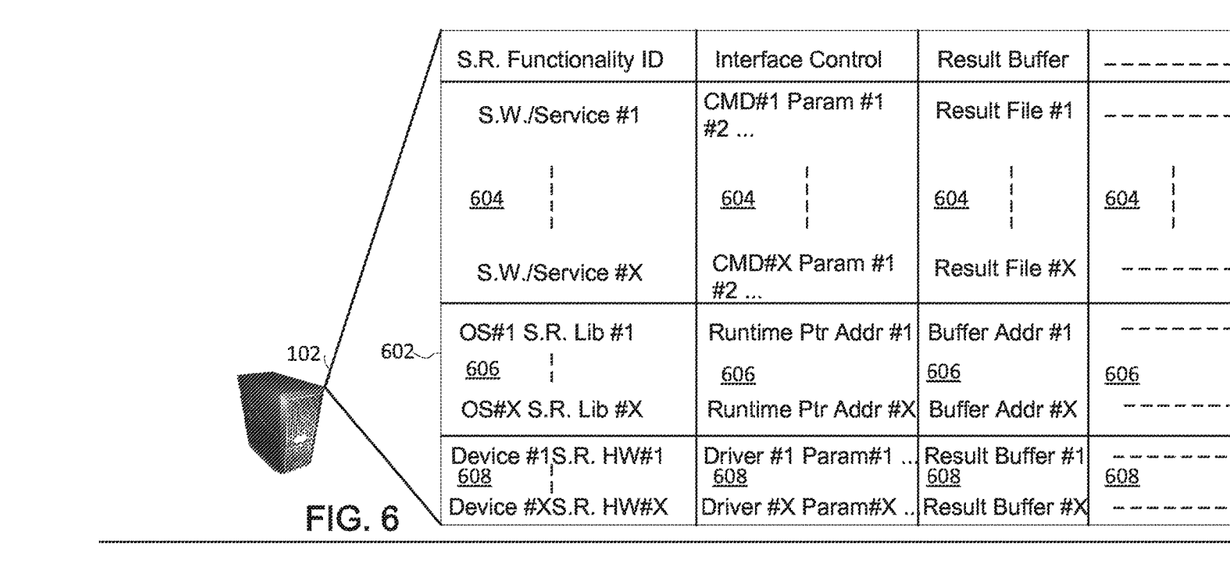
FIG. 6 illustrates one example of control information indicating instructions for evoking specific speech functionality on client devices.

In some implementations, for receiving user speech inputs via the selected speech functionality on the given client device, the speech input processing component 116 may be configured with or have access to information specifying control details for evoking various speech recognition functionalities on client devices 104. Such control information may provide instructions to the speech input processing component 116 for evoking specific speech functionalities provided by client devices. FIG. 6 illustrates one example of control information indicating instructions for evoking specific speech functionality on client devices. As shown, control information 602 may be made accessible to speech input processing component 116 on the server 102. As illustrated, the control information 602 may specify details about how to evoke various speech functionalities on client devices. In this example, as shown, the control information 602 includes command line control information 604 indicating instructions for evoking one or more speech recognition software and/or services on client devices 104. As shown, the command line control information 604 may indicate commands provided by corresponding speech recognition software or services for invocation. As also shown, the command line control information 604 may indicate parameters for evoking the commands, which may include required and as well as optional parameters. By way of non-limiting example, without limitation, a first speech recognition software provided by a $3^{rd}$ party provider may have a command for the software to receive speech input from user on a client device 104 installed with the first speech recognition software. Such a command may be evoked by server 102, for example via the speech input processing component 116 for receiving speech inputs from the user through the first speech recognition software.

As also shown, the command line control information 604 may indicate a result buffer in which speech inputs received by a respective speech recognition software and/or service may be stored and accessed by the server 102 for generating control commands. For example, as an illustration, a given speech recognition software on the client device 104 may start receiving user speech input at instruction of the server 102 as described above, and return the received speech inputs from users in a result buffer as text transcript translated from the received speech inputs. The result buffer may be a storage location on the client device (e.g., a memory address in the RAM or a hard drive storage location on the client device), a storage location on the electronic storage 110, and/or any other network storage location.

As shown in FIG. 6, the information 602 may include runtime speech library information 606 indicating control details for evoking instances speech libraries running on client devices 104. As shown, the runtime speech library information 606 may indicate a runtime memory pointer associated with instance of a given speech library on a client device 104. Such a runtime memory pointer may be used by the server 102 to load the running instance of the given speech library for employing speech recognition functionality provided by the given speech library. As also shown, the runtime speech library information 606 may indicate a buffer address where user speech input received by the speech library may be stored and accessed by the server 102 e.g., via the speech input processing component 116. The buffer may include a storage location on the client device.

As still shown in FIG. 6, the information 602 may include driver information 608 indicating control details for evoking speech recognition hardware on client devices 104. As shown, the driver information 608 may indicate specific drivers for controlling speech recognition hardware on the client devices. As also shown, the driver information 608 may indicate parameters for evoking corresponding drivers. As still shown, the driver information 608 may indicate a result buffer wherein the user speech input received by the speech recognition hardware is stored and made accessible to server 102. Such result buffer may include a storage location on the speech recognition hardware or on the client device.

The control information 602 illustrated in FIG. 6 may be employed by the speech input processing component 116 to evoke speech functionality on a given client device selected by the speech recognition functionality component 114. By way of non-limiting example, without limitation, a first speech recognition functionality (e.g., a third party speech recognition software) may be selected by the speech recognition functionality component 114 for receiving user speech inputs from a given client device 104. In that example, the speech input processing component 116 may initiate the given client device 104 to start receiving user speech inputs using the selected speech recognition functionality, for example by evoking a "start recording" command provided by the speech recognition functionality. For so evoking the speech recognition functionality on the given client device 104, the speech input processing component 116 may access control information, such as the control information 602 illustrated in FIG. 6 that specifies, inter alia, instructions instructing how to evoke the "start recording" command provided by the speech recognition functionality on the given client device 104. In some instances, the selected speech recognition functionality on the given client device 104 may generate a callback event or notification to the speech input processing. In response to such notifications, the speech input processing component 116 may consult the control information 602 for the result buffer address in which the speech recognition functionality stores the text translated from user speech inputs. Using the result buffer address, the speech input processing component 116 may retrieve the text translated from the user speech inputs.

Figure 7:
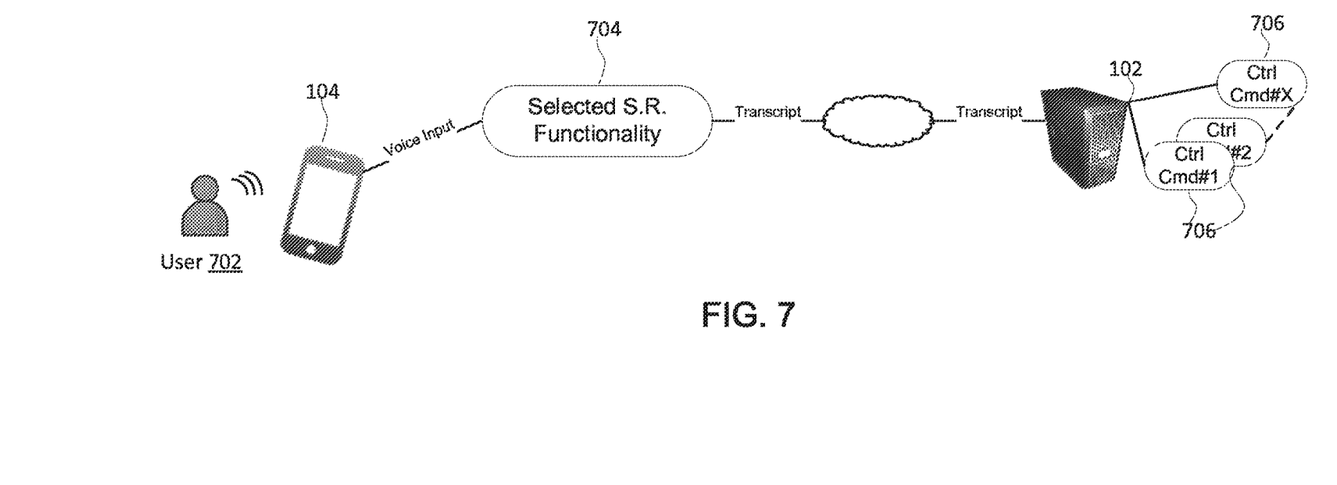
FIG. 7 illustrates one example generating control commands from user speech inputs using selected speech recognition functionality on a client device.

FIG. 7 illustrates one example generating control commands from user speech inputs using selected speech recognition functionality on a client device. As shown, the server 102 may initiate speech input reception by the client device via the selected speech recognition functionality 704. As also shown, a user 702 may provide speech input to the client device 104, which may be translated into text and/or any other format and transmitted to the server 102. The server 102 may process the translated speech inputs by the user for generating one or more control commands 706 as shown.

Returning to FIG. 1, in some implementations, the speech input processing component 116 may be configured to initiate speech recognition through a remote speech recognition service over the Internet when a client device 104 does not have speech recognition functionality available. For instance, the client device information obtained by the client device component 112 may indicate that a given client device 104 does not have any speech recognition functionality available for recognizing speech inputs from users. In those implementations, the speech input processing component 116 may communicate with a remote speech recognition service provider to facilitate the given client device 104 to access the remote speech recognition service provided by the provider. In some examples, the speech input processing component 116 may serve an intermediary between the remote speech recognition service and the given client device 104: for example, the speech input processing component 116 may control a microphone of the given client device 104 to receive user speech inputs in analog form and transmit the analog speech inputs to the remote service provide for translation into text so that the speech input processing component 116 may effectuate generation of control commands based on such text. However, this is not necessarily the only case. In some other examples, the speech input processing component 116 may let the remote speech recognition service communicate with the given client device 104 directly for receiving and translating user speech inputs. In those examples, the speech input processing component 116 may simply retrieve the text translated from the speech input by the remote speech recognition service provider in a storage, such as the external resource 106 or may receive the translated text from the remote speech recognition service provider via any wired or wireless communications.

The server 102, client devices 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client devices 104, and/or external resources 106 may be operatively linked via some other communication media.

A given client device 104 may include one or more processors configured to execute computer program components. The computer program components may be configured to enable an expert or user associated with the given client device 104 to interface with system 100 and/or external resources 106, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

As illustrated in FIG. 1, the computer program components included in the given client device 104 may comprise an application layer, a library layer, a kernel layer, a/or any other layers. The application layer, as shown, may include one or more speech recognition software and/or services for recognizing speech inputs from users. As described above, the speech recognition software and/or services may include those provided by third party speech recognition software providers and/or service providers, speech components provided by the provider of the operating system installed on the given client device 104 and/or any other speech recognition software and/or services. The library layer may comprise speech recognition libraries, development tool kit, and any other reusable components provided by the operating system and/or $3^{rd}$ party providers. The kernel layer may comprise drivers that may be used to control speech recognition hardware coupled to or included in the given client device 104.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines, or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client computing platforms 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116. Processor 108 may be configured to execute components 112, 114, 116 by software; hardware; firmware; some combination of software, hardware, and/or firmware; and/or other mechanisms for configuring processing capabilities on processor 108.

It should be appreciated that although components 112, 114, 116 are illustrated in FIG. 1 as being co-located within a single processing unit, in implementations in which processor 108 includes multiple processing units, one or more of components 112, 114, 116 may be located remotely from the other components. The description of the functionality provided by the different components 112, 114, 116 described below is for illustrative purposes, and is not intended to be limiting, as any of components 112, 114, 116 may provide more or less functionality than is described. For example, one or more of components 112, 114, 116 may be eliminated, and some or all of its functionality may be provided by other ones of components 112, 114, 116. As another example, processor 108 may be configured to execute one or more additional components that may perform some or all of the functionality attributed below to one of components 112, 114, 116.

Figure 8:
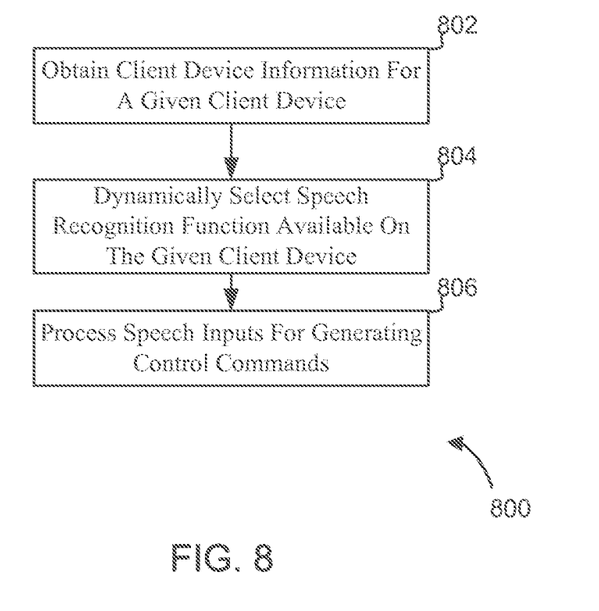
FIG. 8 illustrates one exemplary method for dynamically selecting speech recognition functionality on a client device for recognizing speech inputs from users in accordance with the disclosure.

FIG. 8 illustrates one exemplary method 800 for dynamically selecting speech recognition functionality on a client device for recognizing speech inputs from users in accordance with the disclosure. The operations of method 800 presented below are intended to be illustrative. In some embodiments, method 800 may be accomplished with one or more additional operations not described, and/or without one or more of the operations discussed. Additionally, the order in which the operations of method 800 are illustrated in FIG. 8 and described below is not intended to be limiting.

In some embodiments, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At an operation 802, client device information may be obtained for a given client device. The information obtained in operation 802 may include information indicating speech recognition functionality available on the given client device. The given client device may provide speech recognition functionality for recognizing speech inputs by users through, for example, without limitation, speech recognition software, service, libraries (including runtime libraries), drivers, audio hardware, speech hardware and/or any other speech recognition functionality. In some implementations, operation 802 may be performed by client device component the same as or similar to client device component 112 (shown in FIG. 1 and described herein).

At an operation 804, speech recognition functionality may be selected based on the client device information obtained in operation 802. The selection of speech functionality on the client device in operation 804 may be based on one or more selection criteria. The selection criteria may include, for example, a specified priority list of specific speech recognition functionality that should be selected for recognizing user speech inputs. In some implementations, operation 804 may be performed by a speech recognition functionality component the same as or similar to speech recognition functionality component 114 (shown in FIG. 1 and described herein).

At operation 806, user speech inputs may be processed via the speech recognition functionality selected in operation 804. The control commands may include commands for instructing one or more activities to be performed in the virtual space on behalf of the user, for interacting with other users in the virtual space, for causing the one or more prescribed functions to be executed, and/or any other types of commands. For generating such control commands, operation 806 may initiate user speech input reception via client devices. In some implementations, for receiving user speech inputs via the selected speech functionality on the given client device, control information specifying control details for evoking various speech recognition functionalities on client devices may be made available for access, for example on in an electronic storage. In some implementations, operation 808 may be performed by a speech input processing component the same as or similar to speech input processing component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for dynamically selecting speech recognition functionalities available to be provided by client devices, the system comprising:
    a server, the server including one or more physical processors configured by machine-readable instructions to:
        obtain client device information regarding individual client devices associated with users, the obtained client device information indicating speech recognition functionalities provided by the individual client devices determined based on a type of client device, individual operating systems installed on the individual client devices, and/or serial numbers of the individual client devices, wherein the client device information obtained includes first client device information indicating a first speech recognition functionality and a second speech recognition functionality that are available to be provided by a first client device and are determined based on the first client device having a first device type, a first operating system being installed on the first client device, and/or the first client device having a first serial number, wherein the first speech recognition functionality is separate and distinct from the second speech recognition functionality;
        dynamically select speech recognition functionalities available to be provided by the individual client devices for recognizing speech inputs provided by a user, the dynamic selection of the speech recognition functionalities being based on obtained client device information, and one or both of the type of client device and the operating system installed on the individual client devices, such that the first speech recognition functionality available to be provided by the first client device is dynamically selected for recognizing speech inputs provided by the user through the first client device based on the first client device having the first device type and/or the first operating system being installed on the first client device, while the second speech recognition functionality is not selected; and
        transmit information over a network to the client devices indicating selection of the speech recognition functionalities causing the client devices to use the speech recognition functionalities selected to receive and recognize speech inputs such that selection of the first speech recognition functionality is transmitted to the first client device causing the first client device to receive and recognize speech inputs using the first speech recognition functionality and not the second speech recognition functionality.

2. The system of claim 1, wherein the first and/or second speech recognition functionality indicated by the first client device information include speech recognition software and/or hardware available on the client device.

3. The system of claim 1, wherein the first and/or second speech recognition functionality includes speech recognition functionality provided by the Android operating system, the iOS operating system, the Windows operating system, the MacOS operating system, Linux based operating system, or UNIX based operation system.

4. The system of claim 1, wherein the first client device includes a smartphone, a tablet computer, a laptop, a desktop computer, a netbook, game console, a set top box, and/or a smart TV.

5. The system of claim 1, wherein the dynamic selection of the speech recognition functionalities is further based on selection criteria specifying one or more rules by which speech recognition functionalities provided by the client devices should be selected for recognizing user speech inputs.

6. The system of claim 1, wherein the obtained client device information includes second client device information indicating a third speech recognition functionality available to be provided by a second client device, wherein the third speech recognition functionality is distinct and separate from the first or second speech recognition functionality, and wherein the third speech recognition functionality is dynamically selected for recognizing speech inputs provided by a second user through the second client device.

7. The system of claim 5, wherein the one or more processors are further configured by machine-readable instructions such that a remote speech recognition service is effectuated for the third client device over the Internet.

8. The system of claim 1, wherein the one or more processors are further configured by machine-readable instructions such that the dynamic selection of the first speech recognition functionality is performed at a run-time at which the speech recognition functionality component is loaded by the operating system associated with first client device.

9. The system of claim 1, wherein the obtained client device information includes fourth client device information indicating that a fourth client device does not provide speech recognition functionality, and wherein the one or more physical processors is further configured to effectuate a remote speech recognition service for recognizing speech inputs provided by a third user through the fourth client device.

10. A method for dynamically selecting speech recognition functionalities available to be provided by client devices, the method being implemented by a server including one or more physical processors configured to execute machine-readable instructions, the method comprising:
    obtaining, by the server, client device information regarding individual client devices associated with users, the obtained client device information indicating speech recognition functionalities provided by the individual client devices determined based on a type of client device, individual operating systems installed on the individual client devices, and/or serial numbers of the individual client devices, wherein the client device information obtained includes first client device information indicating a first speech recognition functionality and a second speech recognition functionality that are available to be provided by a first client device and are determined based on the first client device having a first device type, a first operating system being installed on the first client device, and/or the first client device having a first serial number, wherein the first speech recognition functionality is separate and distinct from the second speech recognition functionality;
    dynamically selecting, by the server, speech recognition functionalities available to be provided by the individual client devices for recognizing speech inputs provided by a user, the dynamic selection of the speech recognition functionalities being based on obtained client device information, and one or both of the type of client device and the operating system installed on the individual client devices, such that the first speech recognition functionality available to be provided by the first client device is dynamically selected for recognizing speech inputs provided by the user through the first client device based on the first client device having the first device type and/or the first operating system being installed on the first client device, while the second speech recognition functionality is not selected; and transmitting, by the server, information over a network to the client devices indicating selection of the speech recognition functionalities causing the client devices to use the speech recognition functionalities selected to receive and recognize speech inputs such that selection of the first speech recognition functionality is transmitted to the first client device causing the first client device to receive and recognize speech inputs using the first speech recognition functionality and not the second speech recognition functionality.

11. The method of claim 10, wherein the first and/or second speech recognition functionality indicated by the first client device information include speech recognition software and/or hardware available on the client device.

12. The method of claim 10, wherein the first and/or second speech recognition functionality includes speech recognition functionality provided by the Android operating system, the iOS operating system, the Windows operating system, the MacOS operating system, Linux based operating system, or UNIX based operation system.

13. The method of claim 10, wherein the first client device includes a smartphone, a tablet computer, a laptop, a desktop computer, a netbook, game console, a set top box, and/or a smart TV.

14. The method of claim 10, wherein the dynamic selection of the speech recognition functionalities is further based on selection criteria specifying one or more rules by which speech recognition functionalities provided by the client devices should be selected for recognizing user speech inputs.

15. The method of claim 10, wherein the obtained client device information includes second client device information indicating a third speech recognition functionality provided by a second client device, wherein the third speech recognition functionality is distinct and separate from the first or second speech recognition functionality, and wherein the third speech recognition functionality is dynamically selected for recognizing speech inputs provided by a second user through the second client device.

16. The method of claim 15, further comprising effectuating a remote speech recognition service for the third client device over the Internet.

17. The method of claim 10, wherein the dynamic selection of the first speech recognition functionality is performed at a run-time at which the speech recognition functionality component is loaded by the operating system associated with first client device.

18. The method of claim 10, wherein the obtained client device information includes fourth client device information indicating that a fourth client device does not provide speech recognition functionality, and wherein the method further comprises effectuating a remote speech recognition service for recognizing speech inputs provided by a third user through the fourth client device.

* * * * *